July 10, 1945.　　　H. R. ELLINWOOD　　　2,379,893
CONDUIT CLIP AND SECURING MEANS
Filed Nov. 26, 1941
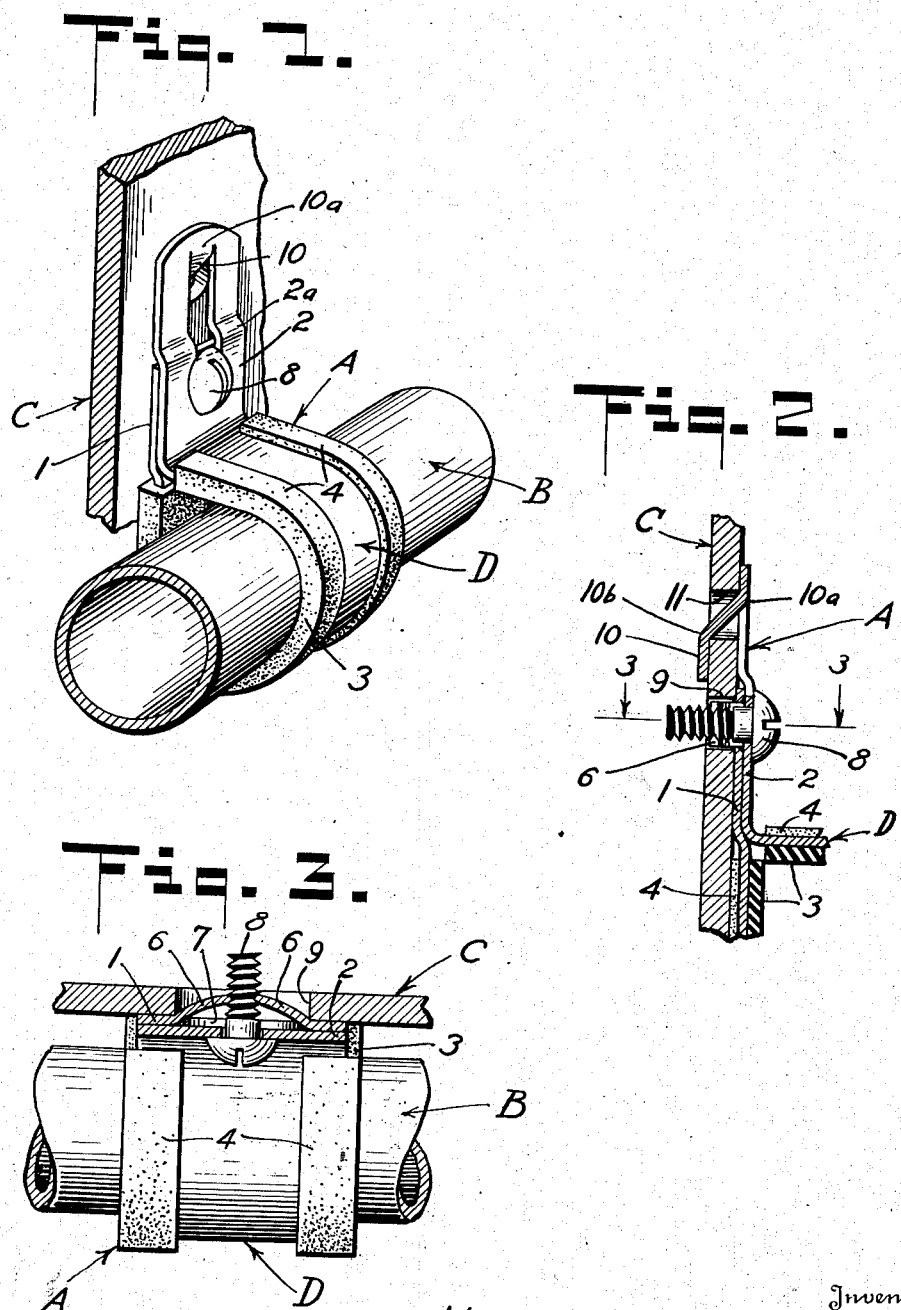
Inventor
HERMAN RAY ELLINWOOD Patented July 10, 1945

2,379,893

UNITED STATES PATENT OFFICE 2,379,893

CONDUIT CLIP AND SECURING MEANS

Herman Ray Ellinwood, Burbank, Calif., assignor to Adel Precision Products Corp., Burbank, Calif., a corporation of California Application November 26, 1941, Serial No. 420,577

1 Claim. (Cl. 248—74)

This invention relates to clips of the type forming the subject matter of United States Letters Patent No. 2,215,283, issued September 17, 1940, to Paul W. Adler, and which are adapted to provide a cushioned and "grounded" support for conduit and other lines in aircraft.

Clips of the type aforementioned usually comprise a strap made of an aluminum alloy or similar metal, adapted to embrace a conduit and support a resilient and insulating cushion against the conduit, the cushion presenting a metallic strip for bonding the conduit to the strap and metal frame of the airplane on which the strap is secured. Such clips are ordinarily secured to the conduit and metal framing of the airplane by means of a bolt and nut, the latter being either a plain screw threaded nut or what is known as an elastic stop or lock nut. Screw threaded nuts, especially the elastic stop nut type are comparatively heavy and expensive and require separate handling where not fixed as parts of the clips. In some clips these stop nuts are shot-welded or riveted to the strap and this entails added costs. Aluminum alloy and similar metal clips have a greater gauge thickness and bulk and sometimes a greater weight than would be required of clips made of other metals, for example, spring steel, and are more likely to become distorted.

In consideration of the foregoing it is an important object of my invention to provide a conduit supporting clip wherein the conduit embracing strap is formed of spring metal such as steel, stainless steel, Phosphor-bronze, or the like, and has a spring nut embodied therein as an integral part thereof to the end that thinner gauge metal may be used at a reduction in bulk, cost and weight, and with an appreciable increase in strength, resistance to vibration fatigue, and ruggedness, while at the same time making it unnecessary to use comparatively heavy and expensive screw threaded nuts which are either separate from or welded or riveted to the clip.

Another object of my invention is to provide a clip of the character described wherein the body portion comprises a one-piece metal strap and nut unit in which the nut is of the lock type having spring tongues for tensioned threaded engagement with the screw or bolt employed to fasten the clip in place.

A further object is to provide a clip of the character next above noted in which the one-piece strap-nut unit may also embody a simple and effective means for anchoring the clip to the metal framing of the airplane without the use of screws or bolts or similar separate fastening elements.

Another object of my invention is to provide a conduit clip such as described wherein one of the terminals of the metal strap forming the body portion of the clip is provided with a spring tongue or like element arranged to hold or assist in effectively holding the clip on the metal frame structure of the aircraft.

Yet another object is to provide a clip such as described wherein the integral spring nuts and the securing tongues aforesaid if provided on the metal strap may be embodied on either one of the free terminal portions of said metal strap with the nut on one terminal and the tongues on the same or the other terminal as desired to best adapt the clip to particular installations.

With the foregoing objects in view, together with such other objects and advantages as may subsequently appear, the invention is carried into effect as illustrated by way of example in the accompanying drawing, in which:

Fig. 1 is a perspective view of a clip embodying my invention;

Fig. 2 is a vertical mid-section thereof, the greater portion of the conduit embracing part of the clip being broken away.

Fig. 3 is a cross sectional view taken on the line 3—3 of Fig. 2.

Referring to the drawing more specifically, A designates a clip embodying my invention, and B represents a conduit line supported by the clip upon a metal structural part or frame member C of an airplane.

In accordance with the present invention the clip A includes a conduit embracing strap D formed of spring steel, Phosphor-bronze or some other suitable spring metal. This strap has free apertured terminals 1 and 2 which are brought close together after the clip is embraced on the conduit to clamp the clip on the conduit and are then secured to the metal structure C.

A cushion 3 of resilient insulation material is supported by the strap so as to embrace the conduit, absorb vibrations in and prevent wear on the conduit, also insulate it from the metal strap. This cushion may be affixed to the strap in any suitable manner, and as here shown has flanges 4 which embrace the side edges and outer face of the strap to hold the cushion in place.

The present invention deals more particularly with the means for securing the clip in place on the metal structure C and also on the conduit B. A spring or elastic nut is formed on the inner terminal 1 of the spring metal strap by striking out from the outer face of said terminal opposed transversely extending and outwardly bowed spring tongues 6, the aperture 7 in said terminal being formed when striking out said tongues. With this integral nut formation on the inner terminal 1 it is seen that when a bolt 8 is inserted through the aperture of the outer terminal 2, and the aperture 7 of terminal 1, and through a lower aperture 9 provided therefor in the structure C, and is manipulated so as to engage the tongues 6, the latter will spread apart and have tensioned and threaded engagement with the screw threads of the bolt, similarly to a nut, the tension of the tongues providing the locking action for holding the bolt against unintentional turning and loosening.

Thus it is seen that the integral nut formation eliminates the use of screw threaded nuts which are separately applied or are fastened in some manner to the strap. The spring nut formation of this invention is obviously cheaper, lighter in weight, and more easily applied than where screw threaded nuts are affixed to the strap or separately applied as the ordinary nut to the bolt. By making the strap of spring metal I am able to embody this comparatively simple and inexpensive form of lock-nut in a terminal of the strap with the advantages hereinbefore noted, also the advantage of a stronger, more durable, and lighter clip as a whole, which lends itself to a greater variety of forms and installations than possible with conduit clips as heretofore made.

The outer terminal 2 of the spring metal strap may be provided with a spring attaching tongue 10 to secure the clip to the structure C of the airplane. In this arrangement the terminal 2 is longer than the terminal 1 and is backwardly deflected at 2a so as directly to overlie an opening 11 in the support through which said tongue is inserted to fasten the strap in place. This arrangement provides an adequate bearing surface for the two end portions of the strap against the structure C and adds to the stability of the clip and of its connection with said structure. The spring tongue 10 is forced into clamping engagement with the structure C as shown in Fig. 2 so as effectively to hold the clip in place. Preferably this tongue is provided with an inward bend 10a at its base, which is located near the outer end of the terminal 1, and is oppositely bent at 10b so that the part of the clip beyond the latter bend, that is to say the free end portion of the clip, is in a parallel, rearwardly spaced relation to the portion of the terminal 1 opposite thereto.

Moreover, the tongue 10 may be of any shape desired to facilitate its function of clamping the clip to the structure C or the like, and it may be extended in any manner and located at any point on the terminal provided it serves the purpose of clamping or assisting in clamping or holding the clip to the frame structure of the airplane.

When the clip has been put in place upon the support C, it is not only sustained by the tongue member 10, but said tongue member functions temporarily to maintain the clip in its conduit embracing position, so that the only thing remaining to be done is to insert and tighten the screw 8.

It should be noted that the present invention is deemed to include the provision on at least one of the terminals of the spring metal strap of the clip, of a projection, tongue or the like adapted to engage and cooperate with the structure on which the clip is mounted in such manner as to hold or assist in holding the clip in place.

While I have shown and described a specific embodiment of my invention I do not limit myself to the exact details of construction set forth, and the invention embraces such changes, modifications and equivalents of the parts and their formation and arrangement as come within the purview of the appended claim.

I claim:

In a support for a conduit or the like, a supporting structure having an aperture therein, a resilient metal strap adapted to embrace a conduit and having apertured terminals adapted to be brought into contact with one another, one of said terminals being disposed to engage said supporting structure, and integral tongues on one of said terminals extending into the aperture in said supporting structure for threadedly engaging therein a threaded fastening inserted through the apertures of said terminals and into the aperture in said supporting structure.

HERMAN RAY ELLINWOOD.